United States Patent
Mitsuma et al.

(10) Patent No.: US 11,221,989 B2
(45) Date of Patent: Jan. 11, 2022

(54) TAPE IMAGE RECLAIM IN HIERARCHICAL STORAGE SYSTEMS

(71) Applicant: International Business Machines Corporation, Armonk, NY (US)

(72) Inventors: Shinsuke Mitsuma, Tokyo (JP); Tsuyoshi Miyamura, Yokohama (JP); Hiroshi Itagaki, Yokohama (JP); Tohru Hasegawa, Tokyo (JP); Noriko Yamamoto, Tokyo (JP); Sosuke Matsui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 16/050,225

(22) Filed: Jul. 31, 2018

(65) Prior Publication Data
US 2020/0042607 A1  Feb. 6, 2020

(51) Int. Cl.
*G06F 16/16* (2019.01)
*G11B 5/008* (2006.01)

(52) U.S. Cl.
CPC ........ *G06F 16/164* (2019.01); *G11B 5/00813* (2013.01)

(58) Field of Classification Search
CPC .. G06F 16/125; G06F 16/215; G06F 16/1748; G06F 16/128; G06F 16/113; G06F 16/1727; G06F 16/219
See application file for complete search history.

(56) References Cited

U.S. PATENT DOCUMENTS

| | | | | |
|---|---|---|---|---|
| 6,023,706 A | * | 2/2000 | Schmuck | G06F 16/1858 |
| 7,979,395 B1 | * | 7/2011 | Aggarwal | G06F 16/128 |
| | | | | 707/649 |
| 8,214,338 B1 | * | 7/2012 | Kirchhoff | G06F 16/113 |
| | | | | 707/693 |

(Continued)

FOREIGN PATENT DOCUMENTS

JP  2015103033 A  *  6/2015

OTHER PUBLICATIONS

Corbett et al., The Vesta Parallel File System: ACM 1996.*
(Continued)

*Primary Examiner* — Daniel A Kuddus
(74) *Attorney, Agent, or Firm* — Aaron N. Pontikos

(57) ABSTRACT

A computer-implemented method for performing a storage reclaim on a storage device includes generating a second tape image on a first storage device. The computer-implemented method further includes copying metadata associated with a first data extent of a valid file from a first index partition of a first tape image to a second index partition of the second tape image. The computer-implemented method further includes copying file data associated with the first data extent from a first data partition of the first tape image to a second data partition of the second tape image. The computer-implemented method further includes adjusting metadata associated with the file data of the first data extent copied to the second data partition of the second tape image. The computer-implemented method further includes releasing a storage area corresponding to the first data extent of the valid file included in the first tape image.

14 Claims, 8 Drawing Sheets

(56) References Cited

U.S. PATENT DOCUMENTS

| | | | |
|---|---|---|---|
| 8,533,158 B1* | 9/2013 | Rao | G06F 3/0608 |
| | | | 707/646 |
| 8,615,534 B2* | 12/2013 | Cannon | G06F 16/119 |
| | | | 707/825 |
| 8,751,768 B2 | 6/2014 | Malige | |
| 9,063,666 B2* | 6/2015 | Amir | G06F 3/0611 |
| 9,430,155 B2* | 8/2016 | Amir | G06F 3/067 |
| 9,703,803 B2* | 7/2017 | Bachar | G06F 16/1844 |
| 2003/0061456 A1* | 3/2003 | Ofek | G06F 11/1448 |
| | | | 711/162 |
| 2011/0238716 A1* | 9/2011 | Amir | G11B 27/032 |
| | | | 707/823 |
| 2011/0238906 A1* | 9/2011 | Amir | G06F 3/0617 |
| | | | 711/111 |
| 2014/0089275 A1 | 3/2014 | Akirav | |
| 2014/0379980 A1* | 12/2014 | Hasegawa | G06F 3/0623 |
| | | | 711/111 |
| 2015/0146317 A1* | 5/2015 | Abe | G11B 5/00817 |
| | | | 360/13 |
| 2016/0330017 A1* | 11/2016 | Youn | H04L 9/008 |
| 2016/0350016 A1* | 12/2016 | Amir | G06F 3/065 |
| 2016/0350017 A1* | 12/2016 | Amir | G06F 3/0682 |
| 2017/0031603 A1 | 2/2017 | Hasegawa | |
| 2017/0052718 A1 | 2/2017 | Abe | |
| 2017/0285958 A1 | 10/2017 | Kawamura | |

OTHER PUBLICATIONS

The Vesta Parallel File System; Corbett et al.; ACM 1996.*

"Defragmentation", Wikipedia, This page was last edited on Jun. 21, 2018, at 11:54 (UTC), pp. 1-4, <https://en.wikipedia.org/wiki/Defragmentation>.

"Linear Tape File System (LTFS) Format Specification", IBM Support, LTFS Format Version 2.0.1, Aug. 17, 2011, 71 pages, <http://www-01.ibm.com/support/docview.wss?uid=ssg1S7003166>.

"Tape Reclamation", Posted by Hasnainshaer's Blog, Posted on Jul. 7, 2012, 5 pages, <https://hasnainshaer.wordpress.com/2012/07/07/tape-reclamation/>.

* cited by examiner

700

710

| | Extent | Stark Block | Byte Offset | Byte Count | File Offset |
|---|---|---|---|---|---|
| File 1 | 1 | N | P | Q | 0 |
| File 1 | 1 | N+2 | S | T | Q |
| File 2 | 2 | N | P+Q | BS − (P+Q) + BS + R | 0 |

720

| | Extent | Stark Block | Byte Offset | Byte Count | File Offset |
|---|---|---|---|---|---|
| File 1 | 1 | n | 0 | Q+T | 0 |
| File 1 | 1 | n+1 | 0 | BS − (P+Q) | 0 |
| File 2 | 2 | n+2 | 0 | BS + R | BS − (P+Q) |

FIG. 7

TAPE IMAGE RECLAIM IN HIERARCHICAL STORAGE SYSTEMS

BACKGROUND

The present invention relates generally to the field of data fragmentation, and more particularly to data fragmentation in linear tape file systems.

Data fragmentation refers to the fragmentation of long, contiguous regions of memory on a storage device, such as a tape drive or hard disk drive, into shorter contiguous regions of memory over time. Data fragmentation occurs when a collection of data, such as files in a file system, are broken up into many, non-contiguous regions on a storage device. This stems from the fact that in a file system, files are usually managed and allocated to memory in chunks or blocks of data of fixed size. When a file system is initially created, there is ample free space to store files blocks together contiguously. However, as files are added, removed, and changed in size, the free space becomes fragmented, leaving only small contiguous regions of memory to store new data. Accordingly, when a new file is written, or an existing file is extended, the operating system attempts to store the data in new non-contiguous data blocks to best utilize the remaining free memory on the storage device.

A linear tape file system (LTFS) is a file system that allows files stored on tape cartridges in a tape library to be accessed in a similar fashion as files stored on a hard disk or flash drive. It requires both a specific format of data on the tape media and software to provide a file system interface to the data. Each LTFS formatted tape cartridge in the library appears as a separate folder under the filesystem mount point. Applying a file system to a tape drive allows users to organize and search the contents of tape media as they would on hard disk, improving access time for data stored on tape media.

SUMMARY

According to one embodiment of the present invention, a computer-implemented method for performing a storage reclaim on a storage device is disclosed. The computer-implemented method includes generating a second tape image on a first storage device, wherein the second tape image is void of any data. The computer-implemented method further includes copying metadata associated with a first data extent of a valid file from a first index partition of a first tape image to a second index partition of the second tape image. The computer-implemented method further includes copying file data associated with the first data extent of the valid file from a first data partition of the first tape image to a second data partition of the second tape image. The computer-implemented method further includes adjusting metadata associated with the file data of the first data extent of the valid file copied to the second data partition of the second tape image. The computer-implemented method further includes releasing a storage area corresponding to the first data extent of the valid file included in the first tape image.

According to another embodiment of the present invention, a computer program product for performing a storage reclaim on a storage device is disclosed. The computer program product includes one or more computer readable storage media and program instructions stored on the one or more computer readable storage media. The program instructions include instructions to generate a second tape image on a first storage device, wherein the second tape image is void of any data. The program instructions further include instructions to copy metadata associated with a first data extent of a valid file from a first index partition of a first tape image to a second index partition of the second tape image. The program instructions further include instructions to copy file data associated with the first data extent of the valid file from a first data partition of the first tape image to a second data partition of the second tape image. The program instructions further include instructions to adjust metadata associated with the file data of the first data extent of the valid file copied to the second data partition of the second tape image. The program instructions further include instructions to release a storage area corresponding to the first data extent of the valid file included in the first tape image.

According to another embodiment of the present invention, a computer system for performing a storage reclaim on a storage device is disclosed. The computer system includes one or more computer system includes one or more computer processors, one or more computer readable storage media, and program instructions stored on the computer readable storage media for execution by at least one of the one or more processors. The program instructions include instructions to generate a second tape image on a first storage device, wherein the second tape image is void of any data. The program instructions further include instructions to copy metadata associated with a first data extent of a valid file from a first index partition of a first tape image to a second index partition of the second tape image. The program instructions further include instructions to copy file data associated with the first data extent of the valid file from a first data partition of the first tape image to a second data partition of the second tape image. The program instructions further include instructions to adjust metadata associated with the file data of the first data extent of the valid file copied to the second data partition of the second tape image. The program instructions further include instructions to release a storage area corresponding to the first data extent of the valid file included in the first tape image.

BRIEF DESCRIPTION OF THE DRAWINGS

FIG. 7 is a block diagram illustrating extent list 710 and extent list 720, generally designated 700, in accordance with at least one embodiment of the present invention.

DETAILED DESCRIPTION

Figure 1:
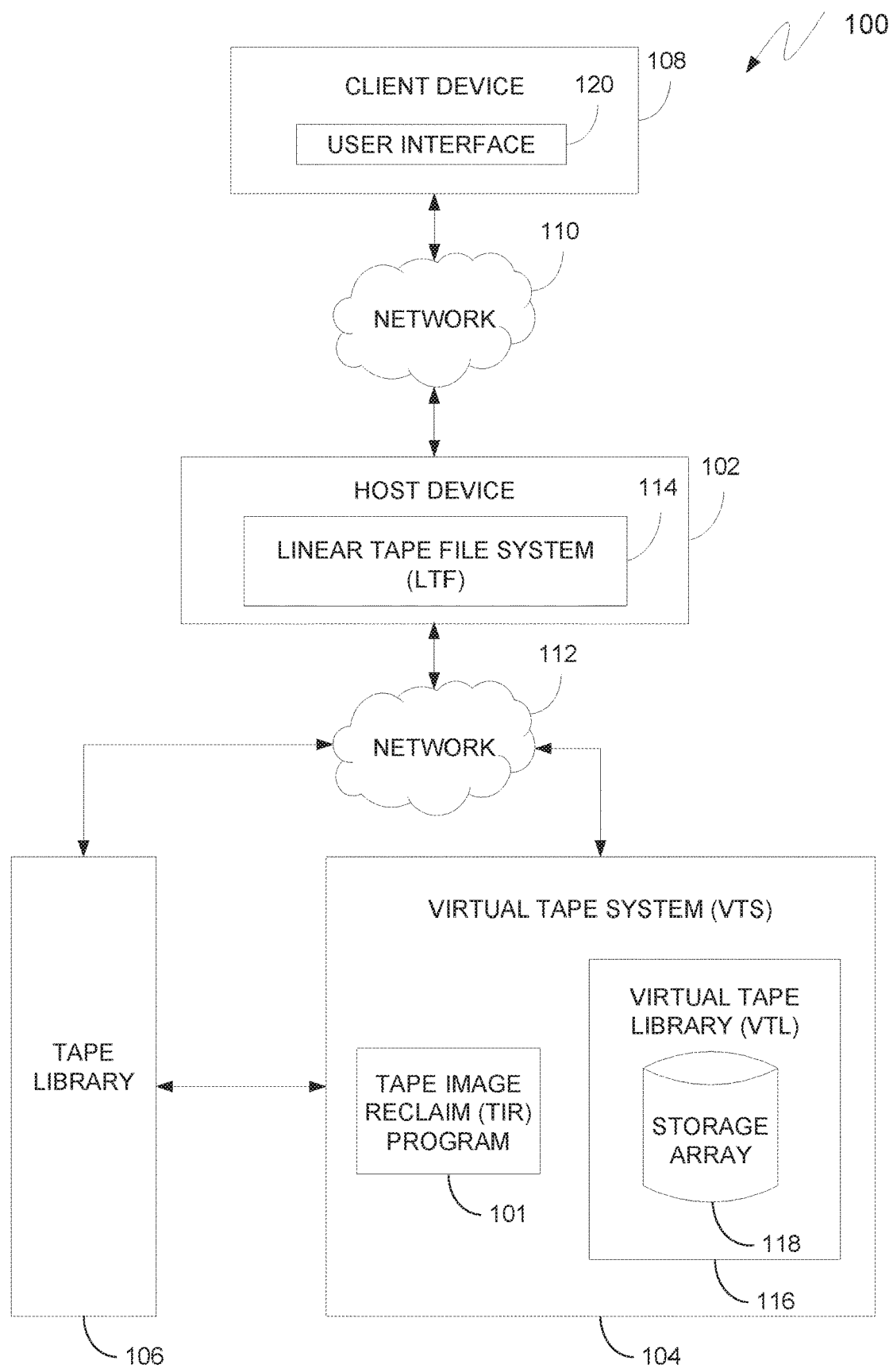
FIG. 1 is a functional block diagram of a network computing environment, generally designated 100, suitable for operation of a tape image reclaim program 101 in accordance with at least one embodiment of the invention.

Embodiments of the present invention recognize that while data stored in a LTFS appears to behave like data stored on a hard disk, the fundamental sequential nature of writing data to magnetic tape media remains. Files are always appended to the end of the tape media. Furthermore, a LTFS is a write-once file system. In other words, if a file stored on one or more data blocks is modified, overwritten or removed from a tape image, the associated data blocks are not freed up. Rather, the memory allocated to the associated data blocks becomes invalid (i.e., the associated data blocks are no longer referenced in an index).

Embodiments of the present recognize several deficiencies with current LTFS technologies. LTFS's incur severe data fragmentation. The most severe consequence of data fragmentation is the failure of an application or system due to premature resource exhaustion (e.g. data is required to be stored as a contiguous block of data and cannot be stored as such). This can occur if a storage device has enough free memory to store the data, but the free memory is fragmented into segments that are too small to store a contiguous piece of data.

Data fragmentation also results in computing performance degradation. Data fragmentation increases the amount of computing resources required to allocate and access a resource. For example, on a hard disk or tape drive, sequential data reads are fast, but seeking to a different address is slow. Thus, reading or writing a fragmented file requires numerous seeks, which results in slowing access to data due to seek time and rotational latency of the read/write head.

Typically, data fragmentation occurs when a collection of logically related data is broken up into many, non-contiguous regions on a storage device. In a LTFS, data fragmentation results from the fact those data blocks that include data that is modified, overwritten, or deleted become invalid. The result is that, although free storage space is available, it is essentially unusable since invalid data blocks are not referenced in a LTFS formatted tape image index partition. This is problematic for data that is modified, overwritten, or newly added, since data that is modified, overwritten, or newly added will be written as separate, smaller non-contiguous blocks at the end of the tape media.

Furthermore, data fragmentation is particularly problematic in a LTFS since reformatting of a storage device (e.g., tape media or hard disk) is generally performed after a large number of data blocks have been invalidated. This stems from the fact that in order to validate the memory capacity of invalid data blocks, the entire storage device (e.g., tape media or hard disk) must be reformatted. This process is known as a tape image reclaim. A tape image reclaim frees up storage space that is occupied by file data that is not referenced (i.e., invalid files) in an index partition of a tape image stored on a storage device. This is accomplished by copying file data that is referenced (i.e., valid files) in an index partition of a tape image stored on a first storage device and writing the valid files onto a second storage device. Once the valid files have been transferred to a second, new storage device, the first storage device is reformatted.

Embodiments of the present invention further recognize that an LTFS can also be implemented with storage devices other than tape drives, such as hard disk drives and flash drives by adding a tape drive emulation component, such as a virtual tape library ("VTL"). A VTL is a data storage virtualization technology that utilizes a storage component (usually hard disk storage) as tape libraries or tape drives for use with existing backup software. Virtualizing the disk storage as tape allows integration of VTLs with existing backup software and existing backup and recovery processes and policies. In essence, a VTL writes data in such a way that the data appears to be stored entirely on tape media when the data is actually located on faster storage devices, such as hard disk drives and solid-state drives. A VTL can be thought of as a disk array that mimics tape. To servers, the VTL appears to be a tape library and the data backup software that writes to it and manages it as if it were tape. However, because a VTL is actually disk-based, it is much faster than tape to read and write. The benefits of such virtualization include storage consolidation and faster data restore processes. Furthermore, by backing up data to disks instead of tapes, a VTL often increases performance of both backup and recovery operations.

Embodiments of the present invention recognize several deficiencies when a LTFS is implemented in a hierarchical storage environment. For example, if a LTFS is implemented with a VTL and a traditional tape drive, emulation software redirects write requests directed toward a tape drive to a hard disk. However, since the data is written to the hard disk as a LTFS formatted file, even if data corresponding to the file is modified or deleted, space is not freed up on the hard disk, but rather invalidated (i.e., not referenced by the index partition of a tape image). Thus, when a large number of data areas on the hard disk become invalid, a reclaim process needs to be executed. Generally, in order to perform a reclaim process, valid files referenced by the index partition of a tape image stored on a first hard disk are copied and transferred to a second hard disk on a per LTFS file basis. Once the valid files have been transferred to a second, new hard disk, the first hard disk is reformatted. Here, the reclaim source is a tape image stored on the existing hard disk and the reclaim target is a second tape image stored on the new hard disk. However, this process is disadvantageous since an additional hard disk is tied up in order to perform the reclaim process.

In some instances, the same data stored on a hard disk is also stored on tape media as a backup. To perform a reclaim process in these cases, valid files stored on the tape media are copied and transferred to a hard disk on a per LTFS file basis. However, this process can take a long time and requires an increased amount of computing resources if a large number of tape seek operations are required due to severe fragmentation of the file storage area of the tape media.

Embodiments of the present invention recognize several further deficiencies when a LTFS is implemented in a hierarchical storage environment. For example, in some instances, data written as a LTFS formatted file can be mirrored between a hard disk and tape media. Again, since the data is written to the hard disk as a LTSF formatted file, even if data is deleted on a hard disk, space is not freed up on the hard disk, but rather invalidated. Thus, when a large number of data areas on the hard disk become invalid, a reclaim process needs to be executed. To perform a reclaim process for data that is mirrored between a hard disk and tape media, valid files referenced by an index partition of a tape image stored on the hard disk can either (i) be copied and transferred to a second hard disk on a per LTFS file basis and the first hard disk drive reformatted once all valid files have been transferred, or (ii) reformat the existing hard disk and copy and transfer all valid files from the mirrored tape media to a reformatted hard disk on a per LTFS file basis. However, the first reclaim process is disadvantageous since an additional hard disk is tied up to perform the reclaim process. Similarly, the second reclaim process is disadvantageous as the reclaim process can take a long time and require an increased amount of computing resources if a large number of tape seek operations are required due to severe fragmentation of the file storage area of the tape media.

Embodiments of the present invention provide one or more of: features, characteristics, operations and/or advantages to the above-mentioned deficiencies and generally encompass (i) an improvement to at least the field of linear tape file systems and (ii) a technical solution to one or more of challenges in the field of linear tape file systems. Such challenges in the field of linear tape file systems include, but are not limited to, one or more of: (i) limitations in the amount contiguous free memory space on tape media and/or hard disk, (ii) limitations in the amount of time and computing resources required to perform read and/or write operations due to data fragmentation, (iii) limitations in performing a reclaim process, (iv) limitations in performing a reclaim process when a LTFS is implemented in a hierarchical storage environment, (v) limitations in performing a reclaim process when a LTFS is implemented with a VTL and a physical tape library, where data stored on a hard disk is also stored on tape media as a backup, and (vi) limitations in performing a reclaim process when a LTFS is implemented with a VTL and a physical tape library, where data stored on a hard disk is also mirrored between tape media. Certain embodiments of the present invention both recognize and address other challenges that are not specifically addressed herein but are readily understood to be encompassed by the technical solutions described herein.

Embodiments of the present invention provide improvements to one or more of the above-mentioned challenges and/or advantages in the field of LTFSs by: (i) generating an empty tape image as a reclaim target on an existing hard disk, and (ii) copying and transferring data from a reclaim source to the reclaim target on a per record basis, thereby ultimately completing a reclaim process on the existing hard disk. Copying and transferring data from a reclaim source on a per record basis in accordance with the reclaim process of the present invention allows for the generation of a tape image as a reclaim target on the same storage device as the reclaim source. This is advantageous since an additional hard disk need not be utilized when performing a reclaim process in accordance with embodiments of the present invention. Moreover, since a reclaim process is typically performed when there is little remaining free memory space on a storage device, a tape image as a reclaim target can be generated on the same storage device as the reclaim source with as little as one free block of memory on the storage device. Additionally, since the reclaim source and reclaim target exist on the same storage device, in some instances, data can be moved, rather than copied, between the reclaim source and the reclaim target.

Embodiments of the present invention provide for the generation of an improved database structure (a tape image as a reclaim target) during a tape image reclaim process that is designed to: (i) improve the way a computer stores and retrieves data in memory and (ii) allows for more effective storage of data on the tape image. In these embodiments, the number of data extents created for a file when data is moved between a reclaim source and a reclaim target is minimized during the reclaim process of the present invention. By reducing the number of data extents in accordance with embodiments of the present invention, a reduction in the amount of data fragmentation on the reclaim target is achieved. In other words, data transferred to the reclaim target during the reclaim process of the present invention is stored more effectively than current known solutions. This ultimately leads to a reduction in the number of tape seek operations required to read/write file data to a tape image and thereby, results in faster processing time for read/write requests.

According to embodiments of the present invention, a reclaim process can be performed in a shorter period of time and without the need to tie up an additional hard disk. Furthermore, according to embodiments of the present invention, a reclaim process can be performed in a shorter amount of time even when severe data fragmentation is present. In embodiments of the invention, if a data extent included in a reclaim source (i.e., first tape image) includes one or more whole records, these whole records are moved, rather than copied, to a reclaim target (i.e., second tape image). Moving, rather than copying whole records, allows for the rapid movement of data during the reclaim process of the present invention.

Thus, embodiments of the present invention provide a technical solution that generates a net gain in overall performance for the computing system; i.e., the overall amount of computing resources that are consumed during a reclaim process compared to alternative solutions. Embodiments of the present invention further provide a technical solution that generates a net gain in overall performance for the computing system; i.e., the overall amount of computing resources that are consumed during read/write operations on a tape image as a reclaim target compared to alternative solutions. Such computing resources include, but are not limited to central processor usage, volume of storage, and the like. Those having skill in the art will recognize that embodiments of the present invention reduce the strain, i.e. resource consumption, experienced: (i) during a tape reclaim process and (ii) during read/write operations on a tape image for data stored in a LTFS and implemented in a hierarchical storage environment when compared to alternative solutions.

Referring now to various embodiments of the invention in more detail, FIG. 1 is a functional block diagram of a network computing environment, generally designated 100, suitable for operation of a tape image reclaim ("TIR") program 101 in accordance with at least one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Network computing environment 100 includes host device 102, virtual tape system (VTS) 104, tape library 106, and client device 108 interconnected over network 110 and network 112. In embodiments of the invention, network 110 can be a telecommunications network, a local area network (LAN), a wide area network (WAN), such as the Internet, or a combination of the three, and can include wired, wireless, or fiber optic connections. In embodiments of the invention, network 112 is a storage area network ("SAN"). Network 112 provides block-level network access to storage, such as virtual tape system 104 and tape library 106. Network 110 and network 112 may include one or more wired and/or wireless networks that are capable of receiving and transmitting data, voice, and/or video signals, including multimedia signals that include voice, data, and video information. In general, network 110 and network 112 may be any combination of connections and protocols that will support communications between client host device 102, VTS 104, tape library 106, client device 108, and other computing devices (not shown) within network computing environment 100.

In various embodiments of the invention, each of host device 102 and VTS 104 are computing devices that can be a standalone device, a management server, a web server, a mobile device, or any other electronic device or computing system capable of receiving, sending, and processing data. In other embodiments, host device 102 and VTS 104 represent a server computing system utilizing multiple computers as a server system, such as in a cloud computing environment. In an embodiment, host device 102 and VTS 104 represent a computing system utilizing clustered computers and components (e.g. database server computers, application server computers, web server computers, etc.) that act as a single pool of seamless resources when accessed within network computing environment 100. In general, host device 102 and VTS 104 represent any programmable electronic device or combination of programmable electronic devices capable of executing machine readable program instructions and communicating with client device 108 and tape library 106 within network computing environment 100 via a network, such as network 110 and network 112.

Host device 102 includes linear tape file system (LTFS) 114. LTFS 114 is a file system that allows files stored on tape media to be accessed in a similar fashion to files stored on a hard disk or flash drive. For example, LTFS 114 is an IBM Linear Tape File System—Library Edition (LTFS-LE) that allows LTFS volumes (i.e., tape media) to be used with a tape library, such as tape library 106. While reference is made to IBM-specific hardware and/or software components, it should be understood that aspects of the present invention may be applied equally to other virtual tape library technologies. Each LTFS-formatted tape media in tape library 106 appears as a separate folder under the file system mount point. An exemplary portion of a tape image of the present invention is further illustrated in FIG. 3 below.

Although LTFS 114 is depicted in FIG. 1 as being integrated with host device 102, in alternative embodiments, LTFS 114 is remotely located from host device 102. In an embodiment, LTFS 114 is integrated with VTS 104. In an embodiment, LTFS 114 is integrated with storage array 118 of VTL 116.

LTFS 114 manages tape images. A tape image includes a pair of LTFS partitions—one Data Partition and one Index Partition—that contain a logical set of files and directories to the files. The term "file" as used herein shall refer to a group of logically related data extents together with associated file meta-data. The term "data extent" as used herein shall refer to a contiguous sequence of recorded blocks (i.e., a set of one or more sequential logical blocks used to store file data). In embodiments of the invention, a file is recorded as one or more extents and each extent corresponds to one or more records. In embodiments of the invention, all records within a data extent have a predetermined storage length (also known as the "block size"). In an embodiment, the default block size is 512 KB or 0.5 MB. However, it should be appreciated that the default block size may be any predetermined size.

In embodiments of the invention, the mapping from file byte offsets to block positions is maintained in the index partition of a tape image and is generally referred to as an extent list. Each entry in an extent list for a file encodes a range of bytes in the file as a range of contiguous bytes in a data extent. Each data extent included in the extent list includes the following information:

(i) Start Block—the block number within the data extent where the content for the extent begins;
(ii) Byte Offset—the number of bytes from the beginning of the start block to the beginning of the file data for the extent.
(iii) Byte Count—the number of bytes of file content in the data extent; and
(iv) File Offset—the number of bytes from the beginning of the file to the beginning of the file data recorded for the extent.

Virtual tape system (VTS) 104 is a cloud or virtual data storage and backup system (e.g., a special storage device, group of devices, etc.) and software, firmware, etc., that has hierarchical storage management functionality, whereby data is migrated between tiered storage. For example, VTS 104 may be an IBM TS7720 Virtualization Engine (TS7720 VE™) or an IBM 7740 Virtualization Engine (TS7740™). While reference is made to IBM-specific hardware and/or software components, it should be understood that aspects of the present invention may be applied equally to other virtual tape library technologies. In embodiments of the invention, VTS 104 migrates data between a primary, high-speed storage media, such as a hard disk, and a secondary, slower speed storage media, such as a magnetic tape.

VTS 104 includes tape image reclaim (TIR) program 101. Although TIR program 101 is depicted in FIG. 1 as being integrated with VTS 104, in alternative embodiments, TIR program 101 is remotely located from VTS 104. In an embodiment, TIR program 101 is integrated with host device 102. In an embodiment, TIR program 101 is integrated with each of host device 102 and VTS 104.

VTS 104 includes virtual tape library (VTL) 116. In embodiments of the invention, VTL 116 is a data storage virtualization technology (i.e., tape drive emulation software) that utilizes a storage component (usually hard disk storage) as tape libraries or tape drives for use with existing backup software. In various embodiments of the invention, VTL 116 converts input/output requests directed to tape library 106 to storage array 118. For example, VTL 116 receives a write request for a record initially directed to be stored on a magnetic tape in tape library 106. However, rather than directly writing the data to tape media in tape library 106, VTL 116 writes (i.e., "saves" or "stores") the data as a logical volume on a hard disk of storage array 118.

In various embodiments of the invention, VTL 116 receives read requests. Upon receiving a read request, VTL 116 determines whether the data is stored on a disk cache of a hard disk. If the requested data is stored as a logical volume on a disk cache of hard disk, the data is read from the disk cache. In some embodiments, if the requested data is stored on tape media in tape library 106, VTS 104 loads the data from the tape media (e.g., a magnetic tape) in tape library 106 to a disk cache of a hard disk of storage array 118, such that the data is read from the disk cache. In some embodiments, if the requested data is stored on tape media in tape library 106, VTS 104 does not load data from the tape media to a hard disk. In these embodiments, information is simply read from the tape media.

In embodiments of the invention, VTS 104 further includes storage array 118 (i.e., disk array). For example, storage array 118 is a RAID (Redundant Array of Independent Disks) based storage system. In some embodiments, storage array 118 is composed of spinning hard disk drives ("HDDs"). In other embodiments, storage array 118 is composed of solid-state disk drives. Each disk in storage array 118 includes a disk cache.

Tape library 106 is an automated tape storage device that includes a plurality of tape drives for writing to and reading from tape media, such as single-reel or two-reel magnetic tape cartridges. In an embodiment, tape library 106 is an IBM TS3400™ Tape Library or an IBM TS3500™ Tape Library. While reference is made to IBM-specific hardware and/or software components, it should be understood that aspects of the present invention may be applied equally to other tape library technologies. In embodiments of the invention, tape library 106 includes a plurality of tape media stored in banks or groups of storage slots. For example, tape media may include, but is not limited to magnetic tape cartridges, magnetic tape cassettes, and optical tape cartridges. Tape library 106 further includes a plurality of slots to hold tape cartridges, a barcode reader to identify tape cartridges and an automated method (e.g., a robot) for loading tapes.

Client device 108 allows a user to access an application running on host device 102 and/or communicate with TIR program 101 via a network, such as network 110 and network 112. Client device 108 may be a laptop computer, tablet computer, netbook computer, personal computer (PC), a desktop computer, a personal digital assistant (PDA), a smart phone, or any programmable electronic device capable of receiving, sending, and processing data. In general, client device 108 represents any programmable electronic device or combination of programmable electronic devices capable of executing machine readable program instructions and communicating with host device 102, VTS 104, tape library 106, and other computing devices (not shown) within computing environment 100 via a network, such as network 110 and network 112.

Client device 108 includes user interface 120. User interface 120 provides an interface between client device 108, host device 102, VTS 104, and tape library 106. In some embodiments, user interface 120 is a graphical user interface (GUI) or a web user interface (WUI) and can display text, documents, web browser windows, user options, application interfaces, and instructions for operation, and includes the information (such a graphic, text, and sound) that a program presents to a user and the control sequences the user employs to control the program. In some embodiments, user interface 120 is mobile application software that provides an interface between client device 108, host device 102, VTS 104, and tape library 106.

Figure 2A:
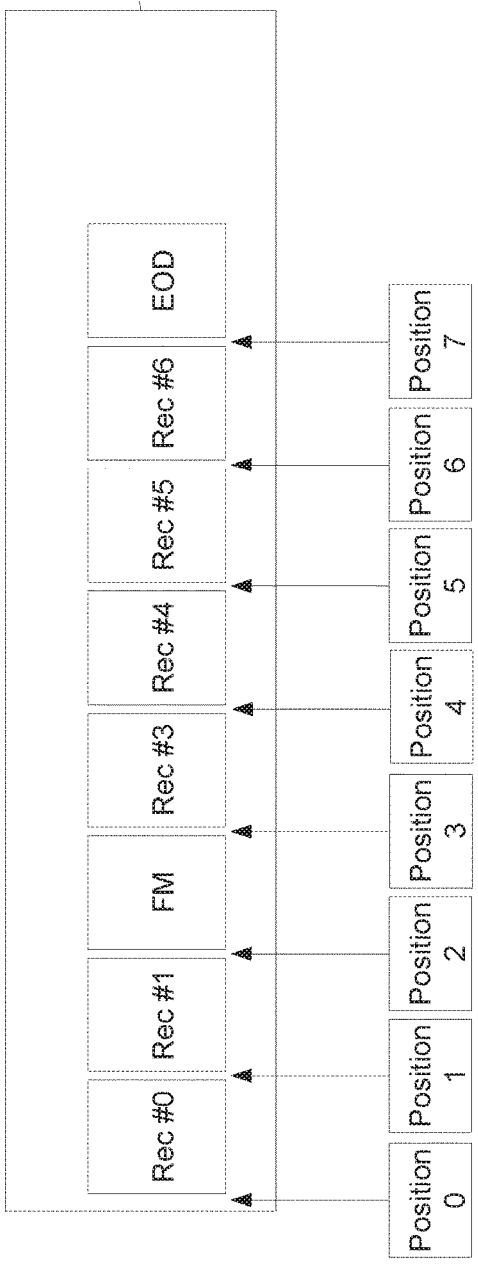
FIG. 2A is a block diagram illustrating an example of a tape media 200A, stored in a tape library 106 in accordance with at least one embodiment of the present invention.

FIG. 2A is a block diagram illustrating an example of a tape media 200A, stored in tape library 106 in accordance with at least one embodiment of the invention. Unlike a read/write command for a block device, such as a hard disk, a read/write command issued to a tape drive does not specify a block number. In embodiments of the invention, the position of data corresponding to a read/write request is determined based on the current position of the tape with respect to the tape head. The current position of the tape is retrievable by issuing a "Read Position" command. Similarly, the position of the tape can be set to any position by issuing a "Locate/Space" command. When a read/write command is successfully executed, the current position of the tape is updated.

In embodiments of the invention, data written to tape media stored in tape library 106 includes the following information: (i) record, (ii) file mark ("FM"), and (iii) end of data ("EOD") mark. The term "record" as used herein shall refer to a variable length data sequence on a tape media. The term "file mark" as used herein shall refer to a zero-length separator on a tape media that delimits data (i.e., records) to a particular file. The term "end of data mark" as used herein shall refer to a designation of the end of the data written to a tape media.

As depicted by FIG. 2A, tape media 200A includes Position 0, Position 1, Position 2, Position 3, Position 4, Position 5, Position 6, and Position 7. Positions 0-7 demarcate physical units of data (i.e., data blocks) on tape media 200A. In embodiments of the invention, blocks can include a single record, part of a record, or multiple records. In some embodiments, data blocks are fixed in size. In some embodiments, data blocks are variable in size. Tape media 200A further includes: Rec #0, Rec #1, Rec #2, Rec #3, Rec #4, Rec #5, and Rec #6. Records 0 and 1 belong to the same file, as indicated by the file mark at position 2. Records 3-6 belong to the same file, and record 6 is the end of the data (as indicated by end of data (EOD) mark located at position 6) written to tape media 200A. In embodiments of the invention, when a "READ" command is issued, the current position of the tape head is updated. For example, if the current position of the tape is at position 3 and a "READ" command is issued, record 3 will be read, and the current position is updated to position 4.

Figure 2B:
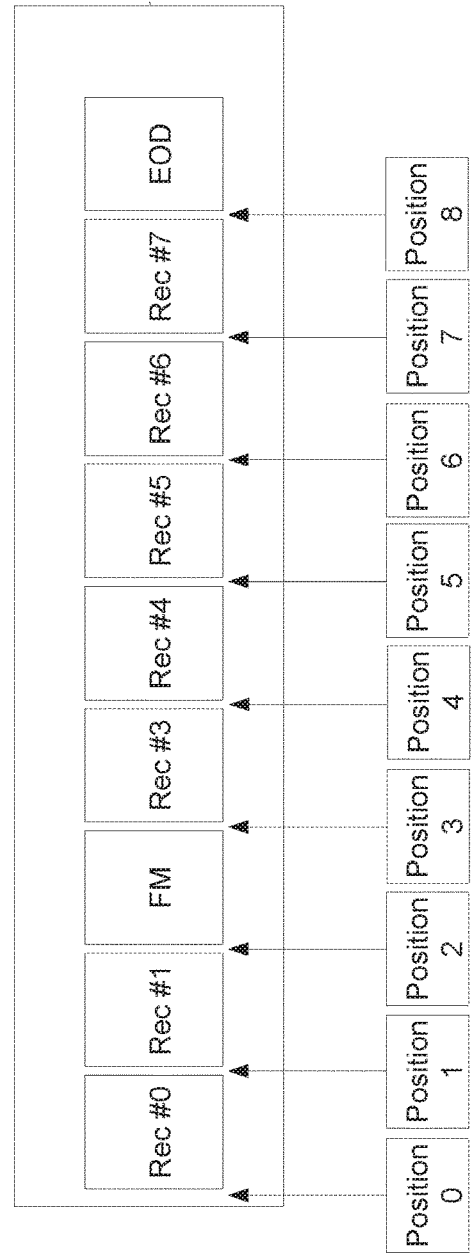
FIG. 2B is a block diagram illustrating an example of a tape media 200B, stored in a tape library 106 in accordance with at least one embodiment of the present invention.

FIG. 2B is a block diagram illustrating an example of a tape media 200B, stored in tape library 106 in accordance with at least one embodiment of the invention. Tape media 200B illustrates tape media 200A of FIG. 2A after a "WRITE" request is received by a tape drive of tape library 106. In embodiments of the invention, a "WRITE" request is issued for one or more of the following: (i) modifying a record, (ii) overwriting a record, and (iii) adding new data. Tape media 200B includes Position 0, Position 1, Position 2, Position 3, Position 4, Position 5, Position 6, Position 7, and Position 8. Here, positions 0-7 on tape media 200B correspond to positions 0-7 on tape media 200A. Tape media 200B further includes: Rec #0, Rec #1, Rec #2, Rec #3, Rec #4, Rec #5, Rec #6, and Rec #7. Here, records 0-6 on tape media 200B correspond to records 0-6 on tape media 200A. In embodiments of the invention, "WRITE" operations append data to the end of the tape media. As depicted by tape media 200B, a "WRITE" request has been issued. Accordingly, since record 6 was the last record written to tape media 200A (at position 6), record 7 is written at position 7 on tape media 200B and the end of the data (EOD) mark is updated to position 8.

Figure 3:
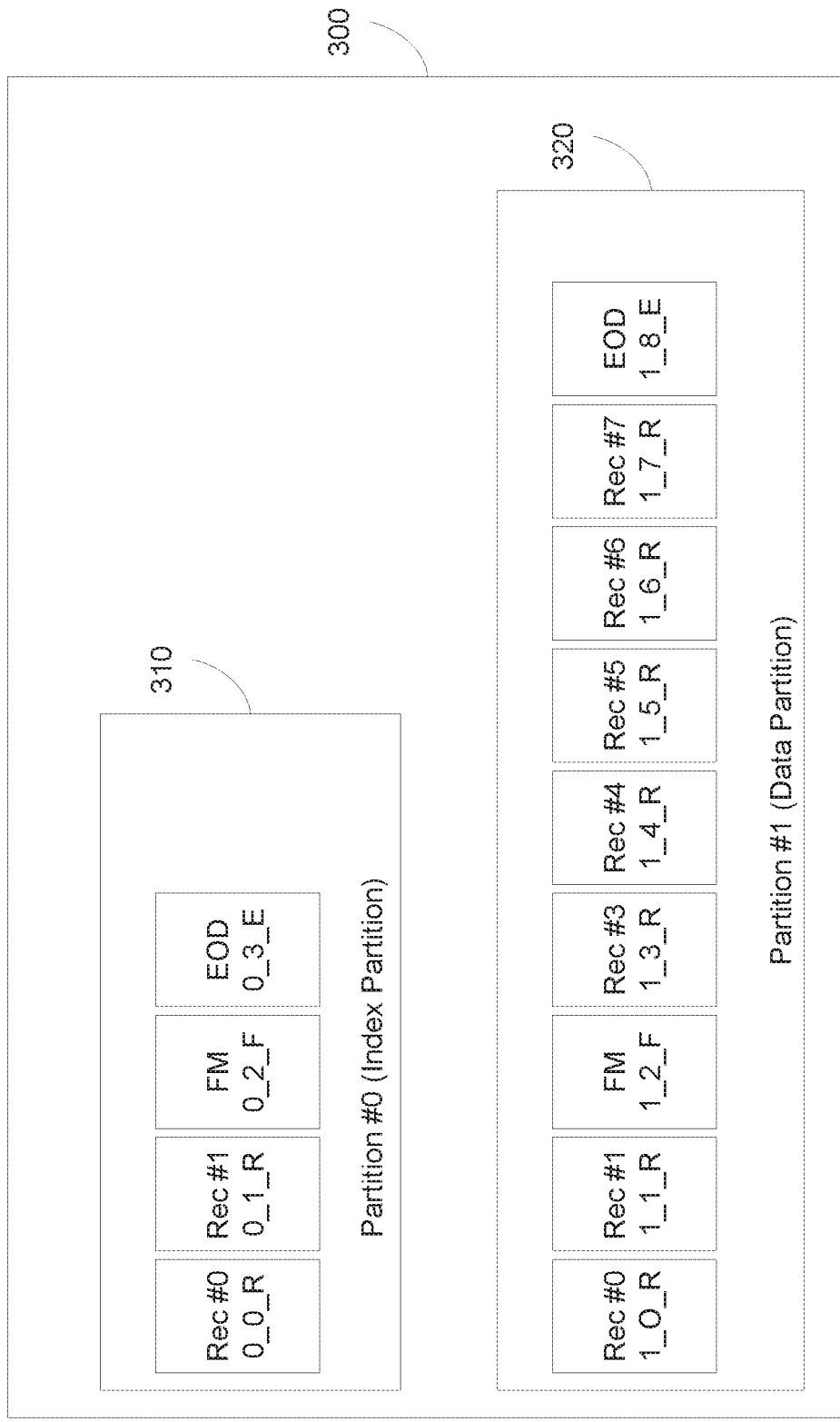
FIG. 3 is a block diagram illustrating an example of a tape image 300 in accordance with at least one embodiment of the present invention.

FIG. 3 is a block diagram illustrating an example of a tape image 300, in accordance with at least one embodiment of the invention. As depicted in FIG. 3, tape image 300 corresponds to the data stored on tape media 200B in FIG. 2B. In some embodiments, tape image 300 is stored on a first storage device, such as a first hard disk in storage array 118. In some embodiments, a directory in a LTFS is regarded as one volume of tape. In embodiments of the invention, tape image 300 holds data files and corresponding metadata to completely describe the directories and file structures stored on tape image 300. Tape image 300 includes a pair of LTFS partitions: (i) index partition 310, and (ii) data partition 320, that include a logical set of files and directories, respectively.

In embodiments of the invention, VTL 116 converts file data from an application initiating a read or write input/output command to tape library 106 to tape image 300 stored on a first hard disk of storage array 118. VTL 116 converts file data, which includes the following attributes: (i) a data record (i.e., record #), (ii) a file mark (FM), and (iii) an end of data (EOD) mark. Each data type is recorded by writing file data within an LTFS partition of a hard disk of storage array 118. In embodiments of the invention, VTL 116 converts the file data into the following LTFS file format: [partition]_[record number]_[record type]. The partition identifies the directory to which the data is written, and the record number and record type (R=Record, F=file mark, and E=end of data mark) identifies the particular file and file content, respectively. For example, 0_500_R indicates a file being located at partition "0," having a record number "500," of which the type of record is a data record. In another example, 1_300_F indicates a file located at partition 1, having a record number "300," of which the type of record is a file mark. In yet another example, 1_5000_E indicates a file being located at partition "0," having a record number "5000," of which the type of record is an end of record mark.

Figure 4:
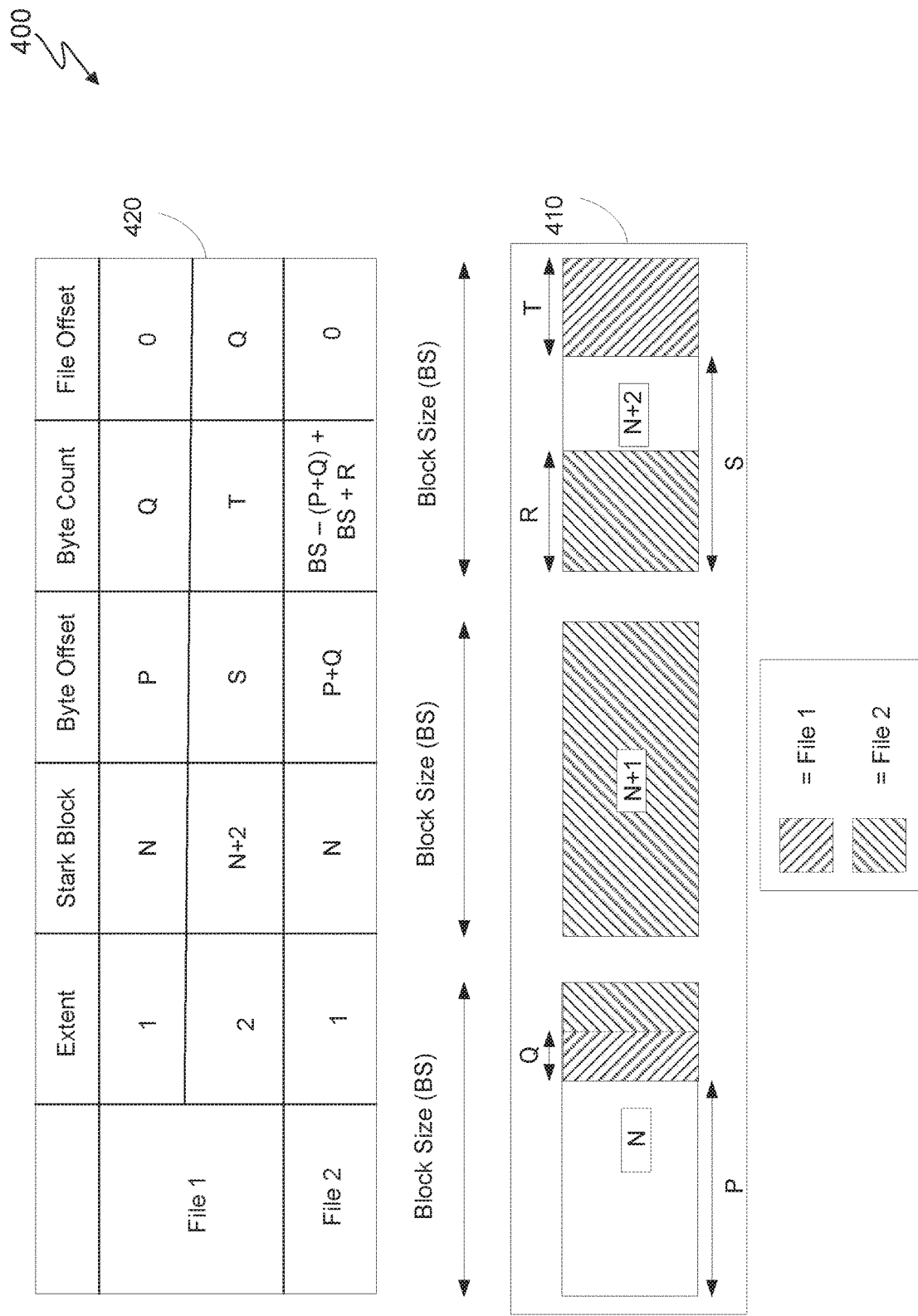
FIG. 4 is a block diagram illustrating an example of file data stored on a LTFS-formatted storage media, generally designated 400, in accordance with at least one embodiment of the present invention.

FIG. 4 is a block diagram illustrating an example of file data stored on a LTFS-formatted storage media, generally designated 400, in accordance with at least one embodiment of the present invention. In some embodiments, file data is stored on tape media of tape library 106. In some embodiments, file data is stored on a hard disk of storage array 118. In embodiments of the invention, the position and length of the data in the file is managed as a collection of extents. FIG. 4 includes storage device 410, which includes three data blocks: N, N+1, and N+2. Each of data blocks N, N+1, and N+2 have a block size (BS), and are sequentially located on storage device 410.

FIG. 4 further includes extent list 420. As depicted by extent list 420, the mapping from file byte offsets to block positions depicted by data blocks N, N+1, and N+2 of storage device 410. In embodiments of the invention, extent list 420 is maintained in the index partition of a tape image. In embodiments of the invention, storage information, such as information included in extent list 420, is retained and accessed by TIR program 101 to perform a reclaim process in accordance with embodiments of the present invention.

Extent list 420 includes the following information with respect to the file data stored on data blocks N, N+1, and N+2 of storage device 410: (i) file number, (ii) extent number, (iii) start block, (iv) byte offset (i.e., the data offset within a record), (v) byte count, and (vi) file offset (i.e., the data offset within a file). In embodiments of the invention, TIR program 101 modifies the index partition of a tape image of LTFS-formatted data to include a file offset. Accordingly, in embodiments of the invention, TIR program 101 converts file data to the following file format: [partition]_[record number]_[record type]_[byte offset]. For example, a file name 1_500_R_200 indicates that a file has a record located in partition "1," having a record number "500," of which the record is located at an offset "200" of the record.

Extent 1 of File 1 is stored on block N and begins at byte offset P, which is a number of bytes from the beginning of block N. The byte count or size of Extent 1 is designated by Q. The file offset of Extent 1 is 0, which indicates that the data corresponding to Extent 1 is the beginning portion of data of a file and/or record. The file offset of Extent 1 is 0, which indicates that the number of bytes from the beginning of the file to the beginning of the file data recorded in Extent 1 is 0. In other words, the data included in Extent 1 is the beginning of the file data of File 1.

Extent 2 of File 1 is stored on block N+2 and begins at byte offset S, which is a number of bytes from the beginning of block N+2. The byte count or size of Extent 2 is designated by T. The file offset of Extent 2 is Q, which indicates a number of bytes from the beginning of the file to the beginning of the file data recorded in Extent 2.

Extent 1 of File 2 is stored on block N and begins at byte offset P+Q, which is the total number of bytes between byte offset P and byte offset Q. The byte count or size of Extent 1 of File 2 is BS (byte size) of Block N−(P+Q)+BS of block N+1+R. The file offset of Extent 1 of File 2 is 0, which indicates that a number of bytes from the beginning of the file to the beginning of the file data recorded in Extent 1 of File 2 is 0. In other words, the data included in Extent 1 of File 2 is the beginning of the file data of File 2.

Figure 5:
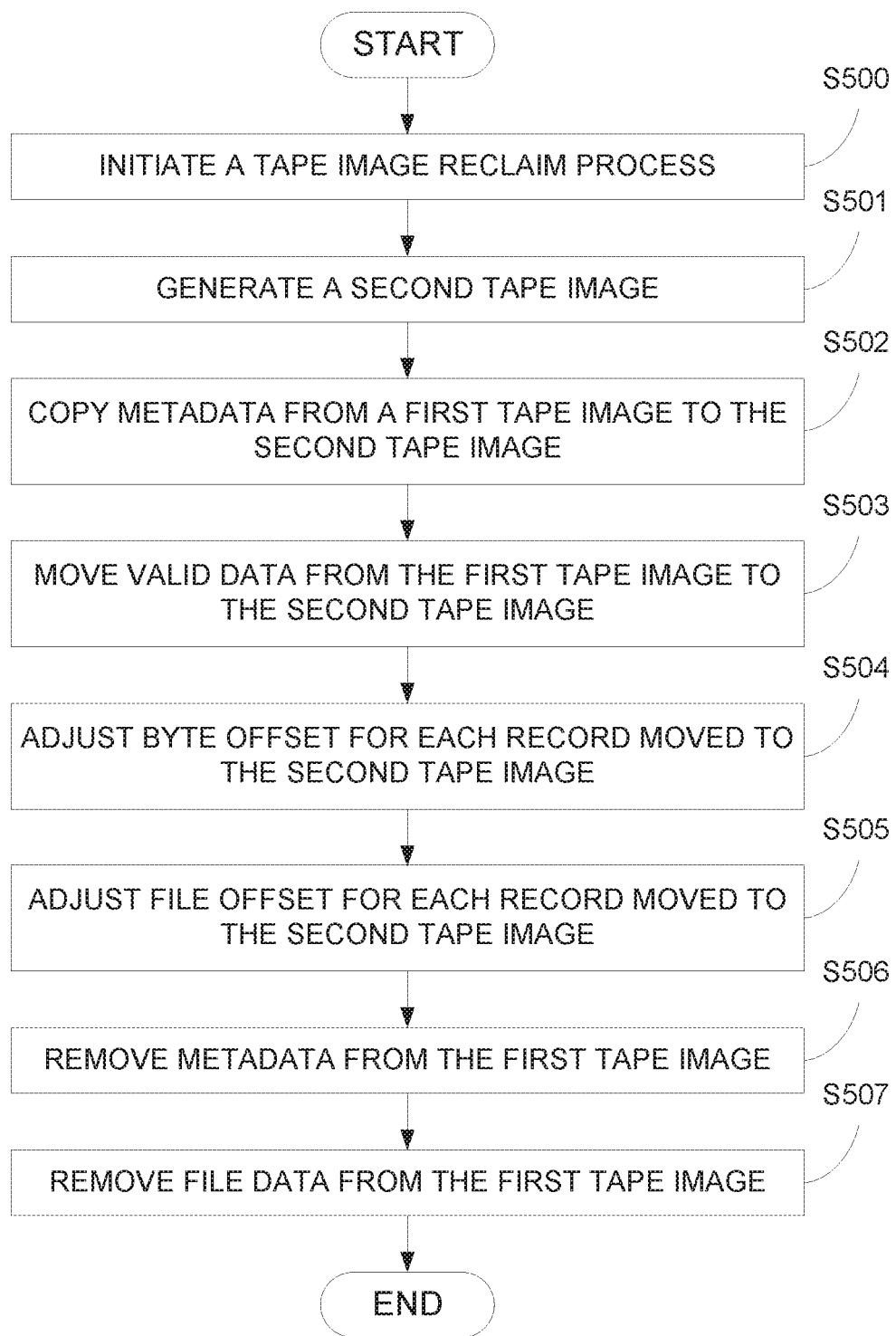
FIG. 5 is a flow chart diagram depicting operational steps for performing a reclaim process by a tape image reclaim program 101 in accordance with at least one embodiment of the present invention.

FIG. 5 is a flow chart diagram depicting operational steps for performing a reclaim process by TIR program 101 in accordance with at least one embodiment of the present invention. FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the reclaim process of the present invention moves valid data from a reclaim source to a reclaim target on a per record basis. This is advantageous since a reclaim process is typically performed when there is little remaining free memory space on a storage device. Thus, the reclaim process of the present invention can be performed so long as there is at least one free block of memory on the storage device.

It should further be appreciated that the reclaim process of the present invention performs a reclaim process from a reclaim source (a first tape image stored on a hard disk) to a reclaim target (a second tape image stored on the same hard disk as the first tape image). Thus, the reclaim process of the present invention can be performed without the need to tie up an additional, second hard disk.

At step S500, TIR program 101 initiates a reclaim process. In embodiments of the invention, a reclaim process is initiated for data stored on a storage device and corresponding to a first tape image. In embodiments of the invention, a reclaim process is initiated for data stored on a disk storage device, such as a hard disk in storage array 118.

In some embodiments, a reclaim process is initiated based, at least in part, on determining that a total amount of free memory space on a storage device falls below a predetermined threshold level. In some embodiments, a reclaim process is initiated based, at least in part, on determining that a number of invalid files in an index partition of a tape image exceeds a predetermined threshold level. In some embodiments, a reclaim process is initiated based, at least in part, on determining that a total amount of memory space utilized by file data corresponding to a number of invalid files in an index partition of a tape image exceeds a predetermined threshold level. In some embodiments, a reclaim process is initiated based, at least in part, on determining that a number of storage blocks having a free memory space below a predetermined number exceed a predetermined threshold number.

In some embodiments, a reclaim process is initiated based, at least in part, on an amount of time required to perform a write operation exceeding a predetermined threshold of time. In some embodiments, a reclaim process is initiated based, at least in part, on an amount of time required to perform a read operation corresponding to a data record exceeding a predetermined threshold.

In some embodiments, a reclaim process is initiated based, at least in part, on a number of tape searches required to perform a write operation exceeding a predetermined threshold. In some embodiments, a reclaim process is initiated based, at least in part, on a number of tape searches required to perform a read operation exceeding a predetermined threshold.

At step S501, TIR program 101 generates a second tape image. In embodiments of the invention, TIR program 101 generates a second tape image on the same storage device as the first tape image. In embodiments of the invention, the second tape image includes an index partition and a data partition. In embodiments of the invention, generating a second tape image includes generating an extent list in the index partition of the second tape image. In embodiments of the invention, when the second tape image is initially generated, the index partition and the data partition of the second tape image are void of any file data or metadata.

At step S502, TIR program 101 copies metadata from a reclaim source to a reclaim target. In embodiments of the invention, the reclaim source shall refer to the first tape image on the hard disk and the reclaim target shall refer to the second tape image on the same hard disk. In some embodiments, the metadata copied to the second tape image corresponds to metadata stored in a first index partition of the first tape image. In some embodiments, the metadata copied to the second tape image corresponds to metadata stored in a first data partition of the first tape image. In some embodiments, the metadata copied to the second tape image corresponds to both metadata stored in a first index partition and file data stored in a first data partition of the first tape image.

In embodiments of the invention, TIR program 101 copies metadata corresponding to at least a first file included in the first index partition of the first tape image to a second index partition of the second tape image. In embodiments of the invention, metadata includes information corresponding to a file and located in an index partition of a tape image. In some embodiments, TIR program 101 copies metadata from each file included in the index partition of the first tape image to the second index partition of the second tape image on a per record basis. In embodiments of the invention, metadata includes information corresponding to a file and located in the index partition of the first tape image. It should be noted that at this point, any file data corresponding to a data extent has yet to be copied and transferred to the second tape image. In other words, at this point, any file data included in the first data partition of the first tape image has yet to be copied and transferred to a second data partition of the second tape image. It should further be noted that at step S502, TIR program 101 only copies metadata for valid files included in the first tape image. This is based on the fact that only valid files are referenced in the index partition of the first tape image in accordance with the LTFS format of the present invention.

At step S503, TIR program 101 moves valid data from the reclaim source to the reclaim target. In embodiments of the invention, TIR program 101 moves valid data corresponding to at least a first file included in the first data partition of the first tape image to a second data partition of the second tape image. In embodiments of the invention, TIR program 101 moves valid data included in the first data partition of the reclaim source to the reclaim target on a per record basis. In embodiments of the invention, moving valid data on a per record basis is done in sequential order of each record included in each data extent of a file included in the first tape image. For example, valid data is moved in accordance with the following algorithm:
  FOR each file in the reclaim source:
  FOR each extent in the file:
    FOR each record in the extent:
      move valid data in the record to the reclaim target:
      set extent of the file in the reclaim target.

In some embodiments, if a data extent included in the first data partition of the first tape image includes one or more complete (i.e., whole) records, TIR program 101 does not issue a copy operation. Rather, if the data extent includes one or more whole records, TIR program 101 moves the data included in the data extent form the first tape image to an empty data block corresponding to the second tape image. It should be appreciated that by moving whole records included in a data extent from the first tape image to the second tape image (and thereby eliminating the time required to copy the data extent), data is able to be moved faster or more rapidly between the first tape image and the second tape image.

At step S504, TIR program 101 adjusts the byte offset of each record transferred to the second tape image. In embodiments of the invention, TIR program 101 adjusts the byte offset for a record stored in an extent list generated in a second index partition of the second tape image. In embodiments of the invention, the byte offset of each record is adjusted based on the following file format of the present invention: [partition]_[record number]_[record type]_[byte offset]. In embodiments of the invention, TIR program 101 adjusts the byte offset of a record moved from a data block corresponding to the first tape image to a data block corresponding to the second tape image. In embodiments of the invention, TIR program 101 adjusts the byte offset of a record based on a position (byte offset) of a record on the data block.

At step S505, TIR program adjusts the file offset of each record transferred to the second tape image. In embodiments of the invention, TIR program 101 adjusts the file offset for a record stored in an extent list generated in a second index partition of the second tape image. In embodiments of the invention, the file offset of each record is adjusted based on constructing an extent list in the second tape image. In embodiments of the invention, TIR program 101 adjusts the file offset of a record moved from a data block corresponding to the first tape image to a data block corresponding to the second tape image. In embodiments of the invention, TIR program 101 adjusts the file offset of each record based on a position of a record with respect to the position of another record in the same file.

At step S506, TIR program 101 removes metadata from the first tape image. In embodiments of the invention, TIR program 101 removes metadata corresponding to each record stored in the first index partition of the first tape image. In some embodiments, TIR program 101 removes metadata corresponding to a record stored in the first index partition after the metadata has been copied to the second index partition of the second tape image. In some embodiments, TIR program 101 removes metadata corresponding to a file stored in the first index partition after metadata corresponding to all the records in the file have been copied to the second index partition of the second tape image. In any of these embodiments, removing metadata from the first index partition of the first tape image results in the removal of metadata from the hard disk.

At step S507, TIR program 101 removes file data (i.e., frees records) from the reclaim source. In embodiments of the invention, TIR program removes file data corresponding to each record stored in the first data partition of the first tape image. In some embodiments, TIR program 101 removes file data corresponding to a record stored in the first data partition of the first tape image after the file data has been copied to the second data partition of the second tape image. In some embodiments, TIR program 101 removes file data corresponding to a file stored in the first data partition after file data corresponding to all the records included in the file have been copied to the second data partition of the second tape image. In any of these embodiments, removing file data from the first data partition of the first tape image results in the removal of file data from the hard disk.

Figure 6:
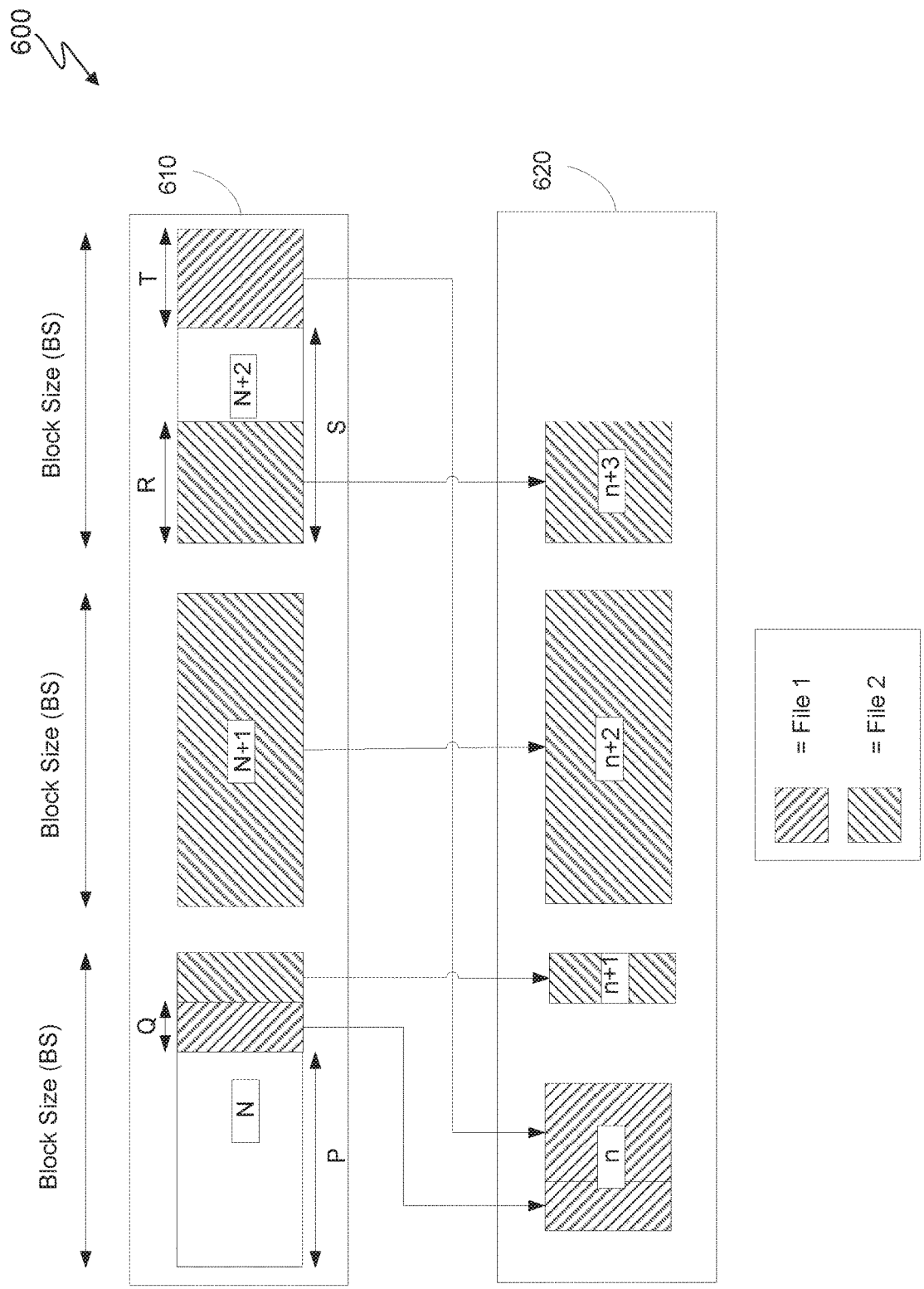
FIG. 6 is a block diagram illustrating a reclaim process, generally designated 600, in accordance with at least one embodiment of the present invention.

FIG. 6 is a block diagram illustrating a reclaim process, generally designated 600, in accordance with at least one embodiment of the present invention. FIG. 6 illustrates the movement of file data corresponding to a first data partition 610 of a first tape image stored on a hard disk to a second data partition 620 of a second tape image stored on the same hard disk. First data partition 610 includes three data blocks: N, N+1, and N+2 stored on the first hard disk. Each of data blocks N, N+1, and N+2 have a block size (BS), and are sequentially located on the first hard disk. Second data partition 620 includes four data blocks: n, n+1, n+2, and n+3 sequentially stored on the first hard disk.

In some embodiments, TIR program 101 minimizes the amount of data extents created for a given file when data is moved from the first tape image to the second tape image during the reclaim process of the present invention. In an embodiment, when a length of the last record stored on a data block for a file in the reclaim target is less than the block size, TIR program 101 appends valid data to the last record stored on the data block (see the combination of Extent 1 (Q) and Extent 2 (T) of File 1 from the reclaim source (first data partition 610) into Extent 1 (Q+T) of File 1 in the reclaim target (second data partition 620). In other words, TIR program 101 appends valid data blocks such that the data block includes as many records for a file as the size of the data block permits.

In another example, assume that: (i) the block size of data block "A" is 0.5 Mb, (ii) the record length of the last record "5" (i.e., most recent record) of a valid file copied and/or moved from the first tape image to the second tape image is 0.2 Mb, and (iii) "X-byte" data to be copied from the next sequential record in the valid file from the first tape image to the second tape image is 0.15 Mb. If TIR program 101 determines that "X-byte" data is less than the free memory space (0.3 Mb) available on data block "A," then "X-byte" data is appended to the end of record "5" on data block "A."

In some embodiments, when a length of the last record stored on a data block for a valid file in the reclaim target is greater than the block size, TIR program 101 appends a first portion of file data of a data extent to the last record stored on the data block and stores the remaining, second portion of the file data on a subsequent data block. For example, assume that: (i) the block size of data block "A" is 0.5 Mb, (ii) the record length of the last record "9" (i.e., most recent record) of a valid file copied and/or moved from the first tape image to the second tape image is 0.2 Mb, and (iii) "X-byte" data to be copied from the next sequential record in the valid file from the first tape image to the second tape image is 0.6 Mb. If TIR program 101 determines that X-byte data is greater than the free memory space (0.3 Mb) available on data block "A," then the first 0.3 Mb of "X-byte" data is appended to the end of record "9" on data block "A" and the next 0.3 Mb of "X-byte" data is stored starting at the beginning of the next sequential data block (e.g., data block "B").

In some embodiments, when the length of "X-byte" data is equal to the block size, TIR program 101 moves "X-byte" data to a new record (i.e., data block) corresponding to the second tape image regardless of the file offset of the record (see the transfer of file data from block N+1 of Extent 1 of File 2 (depicted in first data partition 610) to block n+2 of Extent 2 of File 2 (depicted in second data partition 620)). It should be appreciated that by moving data records that equal the block size of a data block, data is able to be rapidly moved from the first tape image to the second tape image.

FIG. 7 is a block diagram illustrating extent list 710 and extent list 720. Extent list 710 and extent list 720 correspond to metadata stored in a first index partition of the first tape image and a second index partition of the second tape image, respectively. As depicted by extent list 710, the mapping from file byte offsets to block positions depicted by data blocks N, N+1, and N+2 of first data partition 610 (shown in FIG. 6) can be seen. Extent list 710 is maintained in a first index partition of the first tape image. In embodiments of the invention, storage information, such as metadata included in extent list 710, is retained and accessed by TIR program 101 to perform a reclaim process in accordance with embodiments of the present invention.

Extent list 710 includes the following information with respect to the file data included in first data partition 610 of the first tape image stored on data blocks N, N+1, and N+2 (shown in FIG. 6):

Extent 1 of File 1 is stored at block N and begins at byte offset P, which is a number of bytes from the beginning of block N. The byte count or size of Extent 1 is designated by Q. The file offset of Extent 1 is 0, which indicates that the data corresponding to Extent 1 is the beginning portion of data of a file and/or record. The file offset of Extent 1 is 0, which indicates that the number of bytes from the beginning of the file to the beginning of the file data recorded in Extent 1 is 0. In other words, the data included in Extent 1 of File 1 is the beginning of the file data of File 1.

Extent 2 of File 1 is stored at block N+2 and begins at byte offset S, which is a number of bytes from the beginning of block N+2. The byte count or size of Extent 2 is designated by T. The file offset of Extent 2 is Q, which indicates a number of bytes from the beginning of the file to the beginning of the file data recorded in Extent 2.

Extent 1 of File 2 is stored at block N and begins at byte offset P+Q, which is the total number of bytes between byte offset P and byte offset Q. The byte count or size of Extent 1 is BS (byte size) of Block N−(P+Q)+BS of block N+1+R. The file offset of Extent 1 of File 2 is 0, which indicates that a number of bytes from the beginning of the file to the beginning of the file data recorded in Extent 1 of File 2 is 0. In other words, the data included in Extent 1 of File 2 is the beginning of the file data of File 2.

As depicted by extent list 720, the mapping from file byte offsets to block positions depicted by data blocks n, n+1, n+2, and n+3 after performing a reclaim process from a reclaim source (the first tape image on the hard disk) to a reclaim target (the second tape image on the same hard disk) in accordance with at least one embodiment of the present invention. Extent list 720 is maintained in a second index partition of the second tape image. In embodiments of the invention, storage information, such as metadata included in extent list 720, has been copied from the first tape image to the second tape image as a result of performing a reclaim process in accordance with at least one embodiment of the present invention. It should be noted that according to the reclaim process as depicted in FIG. 6, the first tape image and the second tape image are stored on the same hard disk.

Extent list 720 includes the following information with respect to the file data included in second data partition 620 of the second tape image stored on data blocks n, n+1, n+2, and n+3 (shown in FIG. 6).

Extent 1 of File 1 is stored at block n and begins at byte offset 0, which is a number of bytes from the beginning of block n. The byte count or size of Extent 1 is designated by Q+T. The file offset of Extent 1 is 0, which indicates that the number of bytes from the beginning of the file to the beginning of the file data recorded in Extent 1 is 0. In other words, the data included in Extent 1 of File 1 is the beginning of the file data of File 1. It should be noted that during the reclaim process of the present invention, file data copied from a reclaim source to a reclaim target is copied on a per record basis. Accordingly, as depicted in FIG. 6, file data corresponding to Extent 1 and Extent 2 of File 1 stored on the reclaim target have been combined to form a single extent (Extent 1 of File 1 stored on the source target).

Extent 1 of File 2 starts at block n+1 and begins at byte offset 0, which is the total number of bytes between the start of block n+1. The byte count or size of Extent 1 is BS (byte size) of a block−(P+Q). The file offset of Extent 1 of File 2 is 0, which indicates that a number of bytes from the beginning of the file to the beginning of the file data recorded in Extent 1 of File 2 is 0. In other words, the data included in Extent 1 of File 2 is the beginning of the file data of File 2.

Extent 2 of File 2 starts at block n+2 and begins at byte offset 0, which is the total number of bytes between the start of block n+2. The byte count or size of Extent 2 is BS+R. The file offset of offset of Extent 2 of File 2 is BS−(P+Q), which indicates that a number of bytes from the beginning of the file to the beginning of the file data recorded in Extent 2 of File 2 is BS−(P+Q).

Figure 8:
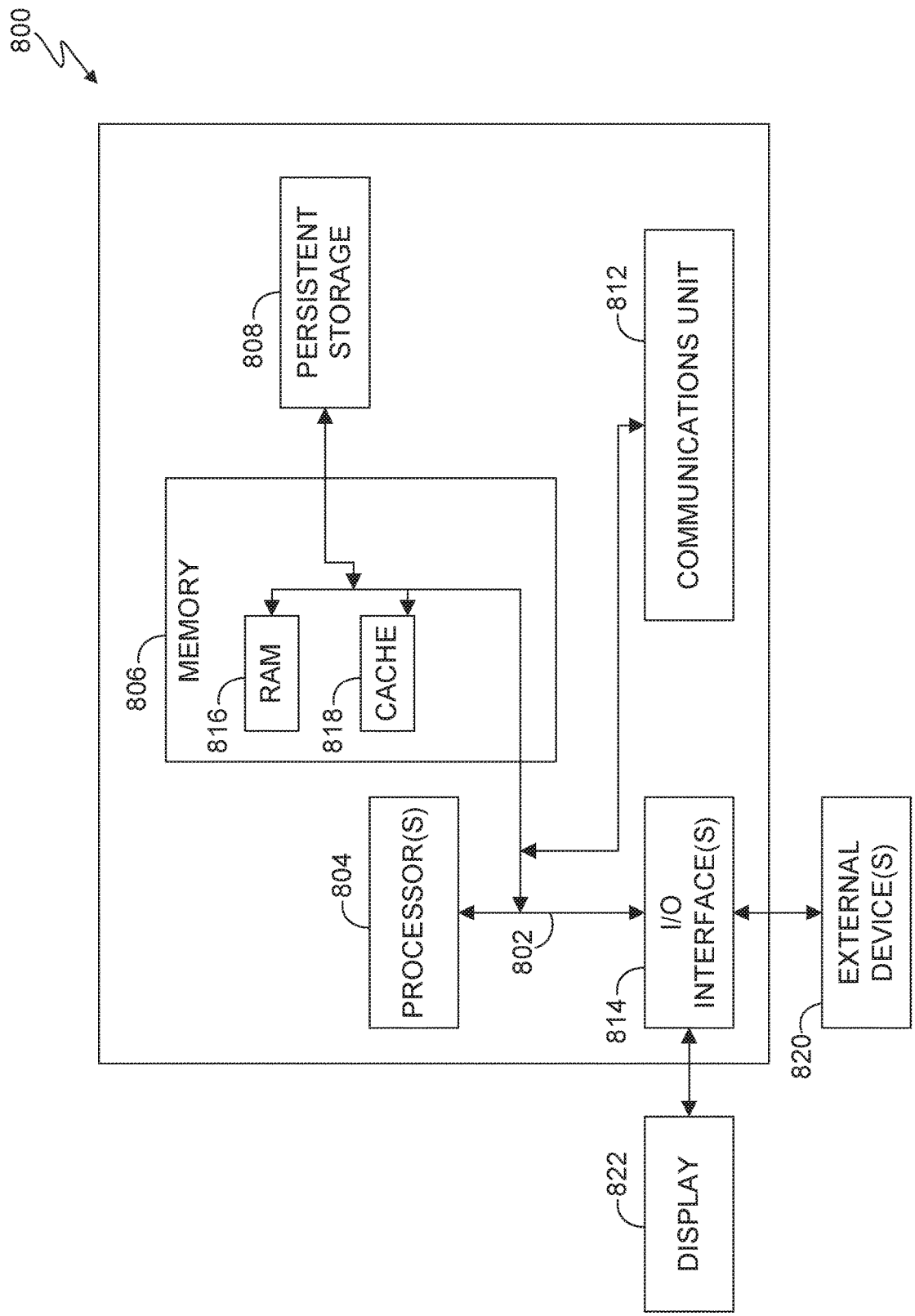
FIG. 8 is a block diagram depicting components of a computer 800 suitable for executing a tape image reclaim program 101 in accordance with at least one embodiment of the invention.

FIG. 8 is a block diagram depicting components of a computer 800 suitable for executing TIR program 101 in accordance with at least one embodiment of the invention. FIG. 8 displays the computer 800, one or more processor(s) 804 (including one or more computer processors), a communications fabric 802, a memory 806 including, a RAM 816, and a cache 818, a persistent storage 808, a communications unit 812, I/O interface(s) 814, a display 822, and external device(s) 820. It should be appreciated that FIG. 8 provides only an illustration of one embodiment and does not imply any limitations with regard to the environments in which different embodiments may be implemented. Many modifications to the depicted environment may be made.

As depicted, the computer 800 operates over the communications fabric 802, which provides communications between the computer processor(s) 804, memory 806, persistent storage 808, communications unit 812, and input/output (I/O) interface(s) 814. The communications fabric 802 may be implemented with any architecture suitable for passing data or control information between the processor(s) 804 (e.g., microprocessors, communications processors, and network processors), the memory 806, the external device(s) 820, and any other hardware components within a system. For example, the communications fabric 802 may be implemented with one or more buses.

The memory 806 and persistent storage 808 are computer readable storage media. In the depicted embodiment, the memory 806 comprises a random-access memory (RAM) 816 and a cache 818. In general, the memory 806 may comprise any suitable volatile or non-volatile one or more computer readable storage media.

Program instructions for TIR program 101 be stored in the persistent storage 808, or more generally, any computer readable storage media, for execution by one or more of the respective computer processor(s) 804 via one or more memories of the memory 806. The persistent storage 808 may be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of the persistent storage 808.

The communications unit 812, in these examples, provides for communications with other data processing systems or devices. In these examples, the communications unit 812 may comprise one or more network interface cards. The communications unit 812 may provide communications through the use of either or both physical and wireless communications links. In the context of some embodiments of the present invention, the source of the various input data may be physically remote to the computer 800 such that the input data may be received, and the output similarly transmitted via the communications unit 812.

The I/O interface(s) 814 allow for input and output of data with other devices that may operate in conjunction with the computer 800. For example, the I/O interface(s) 814 may provide a connection to the external device(s) 820, which may be as a keyboard, keypad, a touch screen, or other suitable input devices. External device(s) 820 may also include portable computer readable storage media, for example thumb drives, portable optical or magnetic disks, and memory cards. Software and data used to practice embodiments of the present invention may be stored on such portable computer readable storage media and may be loaded onto the persistent storage 808 via the I/O interface(s) 814. The I/O interface(s) 814 may similarly connect to a display 822. The display 822 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing a storage reclaim for tape images stored on a disk drive, the computer-implemented method comprising:
   generating a second tape image on the disk drive, wherein the second tape image is void of any data;
   copying only metadata and file data associated with valid files from a first tape image stored on the disk drive to the second tape image stored on the disk drive;
   reducing a number of data extents included in a data partition of the second tape image based on rearranging an order in which records of the valid files are copied from a data partition of the first tape image to respective storage blocks associated with the data partition of the second tape image; and releasing, in response to copying only the metadata and file data associated with the valid files from the first tape image stored on the disk drive to the second tape image stored on the disk drive, the respective storage areas corresponding to an index partition and a data partition of the first tape image, wherein a valid file is file data stored in a data partition on the disk drive that is referenced by an index partition.

2. The computer-implemented method of claim 1, wherein copying metadata associated with the valid files includes:

copying metadata associated with each respective valid file from the index partition of the first tape image to an index partition of the second tape image on a per record basis.

3. The computer-implemented method of claim 1, wherein copying file data associated with the valid files includes:

copying file data associated with each respective valid file from the data partition of the first tape image to the data partition of the second tape image on a per record basis.

4. The computer-implemented method of claim 1, further comprising:

determining that a length of a last sequential record included in a data extent of a valid file copied to the data partition of the second tape image is less than a block size of a data block in which a last sequential record is stored upon;

copying file data associated with a next sequential record of the data extent of the valid file from the data partition of the first tape image to the data partition of the second tape image; and appending the next sequential record of the data extent of the valid file to the end of the last sequential record stored on the data block.

5. The computer-implemented method of claim 1, further comprising:

determining that a length of a final record included in a first data extent of a valid file copied to the data partition of the second tape image is less than a block size of a data block in which a last sequential record is stored upon;

copying file data associated with a first sequential record of a second data extent of the valid file from the data partition of the first tape image to the data partition of the second tape image; and appending the first sequential record of the second data extent of the valid file to the end of the last sequential record stored on the data block.

6. The computer-implemented method of claim 1, further comprising:

determining that a length of a record included in a data extent of a valid file of the first tape image is equal to a block size of a data block in which the record is stored upon; and moving file data associated with the record included in the data extent of the valid file from the data partition of the first tape image to an empty data block in the data partition of the second tape image.

7. The computer-implemented method of claim 1, further comprising:

adjusting metadata associated with the file data of the valid files copied to the data partition of the second tape image, wherein adjusting metadata includes:

adjusting a file offset of one or more of the data extents based on a number of bytes from a beginning of a valid file to a beginning of the file data included in an extent stored in the data partition of the second tape image.

8. The computer-implemented method of claim 7, wherein adjusting metadata associated with the file data of the valid files copied to the data partition of the second tape image further includes:

adjusting a byte offset for one or more records included in each of the valid files based on a position of a record stored on a data block in the data partition of the second tape image.

9. The computer-implemented method of claim 1, wherein the hard disk is configured as a primary storage layer in a hierarchical storage management system including the primary storage layer and a secondary storage layer.

10. The computer-implemented method of claim 1, wherein releasing, in response to copying only the metadata and file data associated with the valid files from the first tape image stored on the disk drive to the second tape image stored on the disk drive, the respective storage areas corresponding to an index partition and a data partition of the first tape includes:

removing metadata associated with the valid files and metadata associated with invalid files stored on the index partition of the first tape image; and removing file data associated with the valid files and file data associated with invalid files stored on the data partition of the first tape image, wherein:

an invalid file is file data in a data partition stored on the disk drive that is not referenced by an index partition.

11. A computer program product for performing a storage reclaim on a disk drive, the computer program product comprising one or more non-transitory computer readable storage media and program instructions stored on the one or more non-transitory computer readable storage media, the program instructions including instructions to:

generate a second tape image on the disk drive, wherein the second tape image is void of any data;

copy only metadata and file data associated with valid files from a first tape image stored on the disk drive to the second tape image stored on the disk drive; and reduce a number of data extents included in a data partition of the second tape image based on rearranging an order in which records of the valid files are copied from a data artition of the first tape image to respective storage blocks associated with the data partition of the second tape image; and release, in response to copying only the metadata and file data associated with the valid files from the first tape image stored on the hard disk to the second tape image stored on the disk drive, the respective storage areas corresponding to an index partition and a data partition of the first tape image, wherein a valid file is file data in a data partition stored on the disk drive that is referenced by an index partition.

12. The computer program product of claim 11, wherein the program instructions to copy metadata associated with the valid files include instructions to:

copy file data associated with each respective valid file from the index partition of the first tape image to an index partition of the second tape image on a per record basis.

13. The computer program product of claim 11, wherein the program instructions to copy file data associated with the valid files includes instructions to:
- copy file data associated with each respective valid file from the data partition of the first tape image to the data partition of the second tape image on a per record basis.

14. A computer system for accelerated data removal for performing a storage reclaim on a storage device, the computer system comprising:
- one or more computer hardware processors;
- one or more computer readable storage media;
- computer program instructions;
- the computer program instructions being stored on the one or more computer readable storage media for execution by the one or more computer hardware processors; and
- the computer program instructions including instructions to:
  - generate a second tape image on the disk drive, wherein the second tape image is void of any data;
  - copy only metadata and file data associated with valid files from a first tape image stored on the disk drive to the second tape image stored on the disk drive; and
  - reduce a number of data extents included in a data partition of the second tape image based on rearranging an order in which records of the valid files are copied from a data partition of the first tape image to respective storage blocks associated with the data partition of the second tape image; and
  - release, in response to copying only the metadata and file data associated with the valid files from the first tape image stored on the hard disk to the second tape image stored on the disk drive, the respective storage areas corresponding to an index partition and a data partition of the first tape image,
    - wherein a valid file is file data in a data partition stored on the disk drive that is referenced by an index partition.

* * * * *